United States Patent
Yamazaki et al.

(10) Patent No.: US 12,361,757 B2
(45) Date of Patent: Jul. 15, 2025

(54) OUTPUTTING NOTIFICATION INFORMATION WHEN HAVING DECIDED THAT INDEPENDENTLY ACTING PERSON BELONGS TO GROUP

(71) Applicant: NEC Corporation, Tokyo (JP)

(72) Inventors: Daiki Yamazaki, Tokyo (JP); Ryuji Wakakusa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 476 days.

(21) Appl. No.: 17/788,832

(22) PCT Filed: Dec. 27, 2019

(86) PCT No.: PCT/JP2019/051455
§ 371 (c)(1),
(2) Date: Jun. 24, 2022

(87) PCT Pub. No.: WO2021/131025
PCT Pub. Date: Jul. 1, 2021

(65) Prior Publication Data
US 2023/0029464 A1    Feb. 2, 2023

(51) Int. Cl.
*G06V 40/00*    (2022.01)
*G06V 40/20*    (2022.01)
*G08B 21/02*    (2006.01)

(52) U.S. Cl.
CPC ............ *G06V 40/20* (2022.01); *G08B 21/02* (2013.01)

(58) Field of Classification Search
CPC .................. G06V 40/20; G06V 20/52; G06T 2207/30196; G06T 7/20; G06T 2207/30232; G06T 7/00
See application file for complete search history.

(56) References Cited

U.S. PATENT DOCUMENTS

| | | | |
|---|---|---|---|
| 10,776,627 B2 * | 9/2020 | Nishikawa | G06V 20/30 |
| 10,846,536 B2 * | 11/2020 | Ikeda | G06V 40/23 |
| 2012/0264456 A1 * | 10/2012 | Park | H04L 67/52 |
| | | | 455/456.3 |
| 2018/0012471 A1 * | 1/2018 | Bauer | H04W 4/029 |
| 2020/0319305 A1 * | 10/2020 | Yeh | G01S 17/66 |
| 2021/0279450 A1 * | 9/2021 | Niino | H04N 7/18 |

FOREIGN PATENT DOCUMENTS

| | | | |
|---|---|---|---|
| JP | 2006092396 A | * | 4/2006 |
| JP | 2007-060528 A | | 3/2007 |
| JP | 2015176198 A | * | 10/2015 |
| JP | 2018-132803 A | | 8/2018 |
| JP | 2018-201176 A | | 12/2018 |

OTHER PUBLICATIONS

International Search Report for PCT Application No. PCT/JP2019/051455, mailed on Mar. 17, 2020.

* cited by examiner

Primary Examiner — Li Liu

(57) ABSTRACT

The present invention provides a processing apparatus (10) including: an acquisition unit (11) that acquires an image generated by a camera; an extraction unit (12) that extracts, from the image, an independently acting person being a person taking independent action; a decision unit (13) that decides whether the independently acting person belongs to any of groups, based on group information in which a feature value of an appearance of a person who takes group action is registered; and an output unit (14) that outputs notification information when it is decided that the independently acting person belongs to any of the groups.

8 Claims, 11 Drawing Sheets

FIG. 3

| GROUP INFORMATION | | | | | | | |
|---|---|---|---|---|---|---|---|
| GROUP IDENTIFICATION INFORMATION | EMERGENCY CONTACT ADDRESS | MEMBER 1 | | | | MEMBER 2 | ... |
| | | NAME | CONTACT ADDRESS | FACE IMAGE | FEATURE VALUE | | |
| 000001 | ···@···.com | TARO TOKYO | ···@···.com | ·····.jpeg | *** | ··· | ··· |
| ···· | ···· | ···· | ···· | ···· | ···· | ···· | ···· |

FIG. 4

| NOTIFICATION INFORMATION | | | | | |
|---|---|---|---|---|---|
| DATE AND TIME | PLACE | NAME | GROUP IDENTIFICATION INFORMATION | IMAGE | ... |
| 2019.11. 26.13:01 | O× DISTRICT | KAI OHSAKI | 001328 | ****.jpeg | ... |
| 2019.11. 26.13:18 | ×× DISTRICT | KYO KAGAWA | 000711 | ****.jpeg | ... |
| .... | .... | .... | .... | .... | .... |

FIG. 8

| GROUP INFORMATION | | | | | |
|---|---|---|---|---|---|
| GROUP IDENTIFICATION INFORMATION | MEMBER 1 | | MEMBER 2 | | ... |
| | FACE IMAGE | FEATURE VALUE | ... | ... | ... |
| 000001 | ****.jpeg | *** | ... | ... | ... |
| .... | .... | .... | .... | .... | .... |

FIG. 10

NOTIFICATION INFORMATION

| DATE AND TIME | PLACE | FACE IMAGE | FEATURE VALUE | GROUP IDENTIFICATION INFORMATION | ... |
|---|---|---|---|---|---|
| 2019.11.26 13:01 | ○×DISTRICT | ****.jpeg | *** | 001328 | ... |
| 2019.11.26 13:18 | ××DISTRICT | ****.jpeg | *** | 000711 | ... |
| .... | .... | .... | .... | .... | .... |

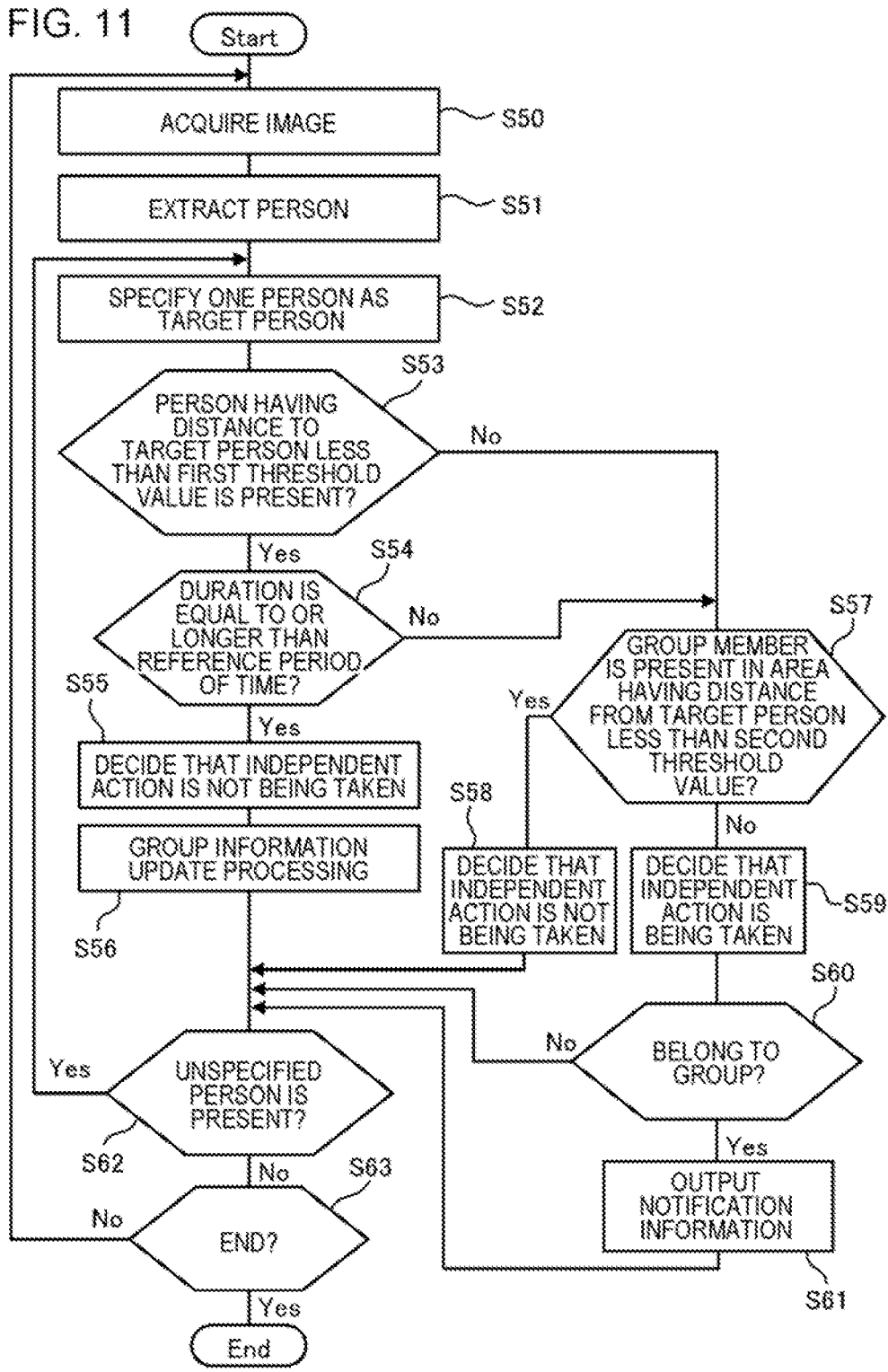

OUTPUTTING NOTIFICATION INFORMATION WHEN HAVING DECIDED THAT INDEPENDENTLY ACTING PERSON BELONGS TO GROUP

This application is a National Stage Entry of PCT/JP2019/051455 filed on Dec. 27, 2019, the contents of all of which are incorporated herein by reference, in their entirety.

TECHNICAL FIELD

The present invention relates to a processing apparatus, a processing method, and a program.

BACKGROUND ART

Patent Document 1 discloses a technique for determining, from a positional relationship between persons detected from a moving image, that a set of persons in which a state where a relative distance falls below a threshold value continues for a period of time longer than a threshold value belongs to a group taking the same action, and determining that a person unlike the above-described persons is taking independent action. Patent Document 2 discloses a technique for detecting whether a moving body detected from an image is acting independently.

RELATED DOCUMENT

Patent Document

[Patent Document 1] Japanese Patent Application Publication No. 2006-92396
[Patent Document 2] Japanese Patent Application Publication No. 2015-176198

DISCLOSURE OF THE INVENTION

Technical Problem

For example, when a country or a region being unsafe is visited under a specific situation, group action may be recommended. However, there is a possibility that a person who leaves a group due to some sort of trouble and the like and unintentionally takes independent action, a person who intentionally leaves a group and takes independent action, and the like may appear. A technique for detecting a person who leaves a group and takes independent action in such a manner is desired. The techniques in Patent Documents 1 and 2 simply detect a person taking independent action, and do not detect a person who leaves a group and takes independent action.

The present invention has a challenge to provide a technique for detecting a person who leaves a group and takes independent action.

Solution to Problem

The present invention provides a processing apparatus including:
an acquisition means for acquiring an image generated by a camera;
an extraction means for extracting, from the image, an independently acting person being a person taking independent action;
a decision means for deciding whether the independently acting person belongs to any of groups, based on group information in which a feature value of an appearance of a person who takes group action is registered; and
an output means for outputting notification information when it is decided that the independently acting person belongs to any of the groups.

Further, the present invention provides a processing method including:
by a computer,
acquiring an image generated by a camera;
extracting, from the image, an independently acting person being a person taking independent action;
deciding whether the independently acting person belongs to any of groups, based on group information in which a feature value of an appearance of a person who takes group action is registered; and
outputting notification information when it is decided that the independently acting person belongs to any of the groups.

Further, the present invention provides a program causing a computer to function as:
an acquisition means for acquiring an image generated by a camera;
an extraction means for extracting, from the image, an independently acting person being a person taking independent action;
a decision means for deciding whether the independently acting person belongs to any of groups, based on group information in which a feature value of an appearance of a person who takes group action is registered; and
an output means for outputting notification information when it is decided that the independently acting person belongs to any of the groups.

Advantageous Effects of Invention

The present invention achieves a technique for detecting a person who leaves a group and takes independent action.

BRIEF DESCRIPTION OF THE DRAWINGS

The above-described object, the other objects, features, and advantages will become more apparent from suitable example embodiment described below and the following accompanying drawings.

FIG. 3 is a diagram schematically illustrating one example of information processed by the processing apparatus according to the present example embodiment.

FIG. 4 is a diagram schematically illustrating one example of information processed by the processing apparatus according to the present example embodiment.

FIG. 8 is a diagram schematically illustrating one example of information processed by the processing apparatus according to the present example embodiment.

FIG. 10 is one example of a functional block diagram of the processing apparatus according to the present example embodiment.

FIG. 11 is a flowchart illustrating one example of a flow of processing of the processing apparatus according to the present example embodiment.

DESCRIPTION OF EMBODIMENTS

First Example Embodiment

First, an outline of a processing apparatus according to the present example embodiment will be described. When the processing apparatus acquires an image generated by a camera, the processing apparatus extracts a person (an independently acting person) taking independent action from an image. When the independently acting person is extracted, the processing apparatus decides whether the independently acting person belongs to any group, based on group information in which a feature value of an appearance of a person who takes group action is registered by group. Then, when the processing apparatus decides that the independently acting person belongs to any group, the processing apparatus outputs notification information.

Such a processing apparatus can detect a person who leaves a group and takes independent action.

Next, a configuration of the processing apparatus will be described in detail. First, one example of a hardware configuration of the processing apparatus will be described.

Each functional unit of the processing apparatus is achieved by any combination of hardware and software concentrating on a central processing unit (CPU) of any computer, a memory, a program loaded into the memory, a storage unit (that can also store a program downloaded from a storage medium such as a compact disc (CD), a server on the Internet, and the like in addition to a program previously stored at a stage of shipping of an apparatus) such as a hard disk that stores the program, and a network connection interface. Then, various modification examples of an achievement method and an apparatus thereof are understood by a person skilled in the art.

Figure 1:
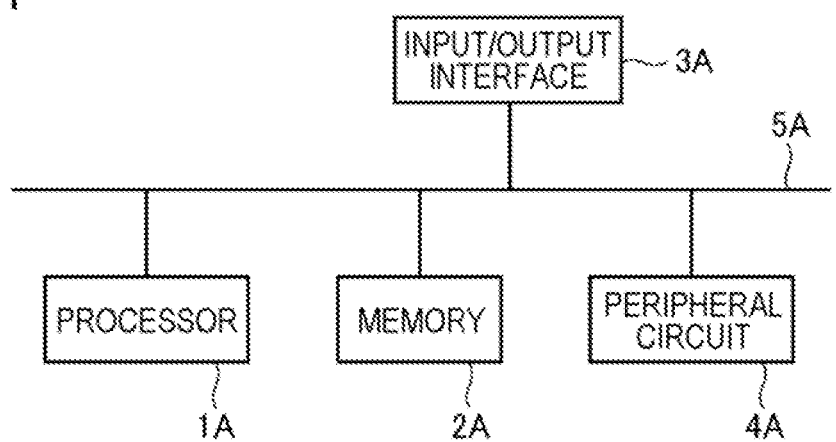
FIG. 1 is a diagram illustrating one example of a hardware configuration of a processing apparatus according to the present example embodiment.

FIG. 1 is a block diagram illustrating a hardware configuration of the processing apparatus. As illustrated in FIG. 1, the processing apparatus includes a processor 1A, a memory 2A, an input/output interface 3A, a peripheral circuit 4A, and a bus 5A. Various modules are included in the peripheral circuit 4A. The processing apparatus may not include the peripheral circuit 4A. Note that, the processing apparatus may be formed of a plurality of apparatuses separated physically and/or logically, or may be formed of one apparatus integrated physically and/or logically. When the processing apparatus is formed of a plurality of apparatuses separated physically and/or logically, each of the plurality of apparatuses can include the hardware configuration described above.

The bus 5A is a data transmission path for the processor 1A, the memory 2A, the peripheral circuit 4A, and the input/output interface 3A to transmit and receive data to and from one another. The processor 1A is an arithmetic processing apparatus such as a CPU and a graphics processing unit (GPU), for example. The memory 2A is a memory such as a random access memory (RAM) and a read only memory (ROM), for example. The input/output interface 3A includes an interface for acquiring information from an input apparatus, an external apparatus, an external server, an external sensor, a camera, and the like, an interface for outputting information to an output apparatus, an external apparatus, an external server, and the like, and the like. The input apparatus is, for example, a keyboard, a mouse, a microphone, a physical button, a touch panel, and the like. The output apparatus is, for example, a display, a speaker, a printer, a mailer, and the like. The processor 1A can output an instruction to each of modules, and perform an arithmetic operation, based on an arithmetic result of the modules.

Figure 2:
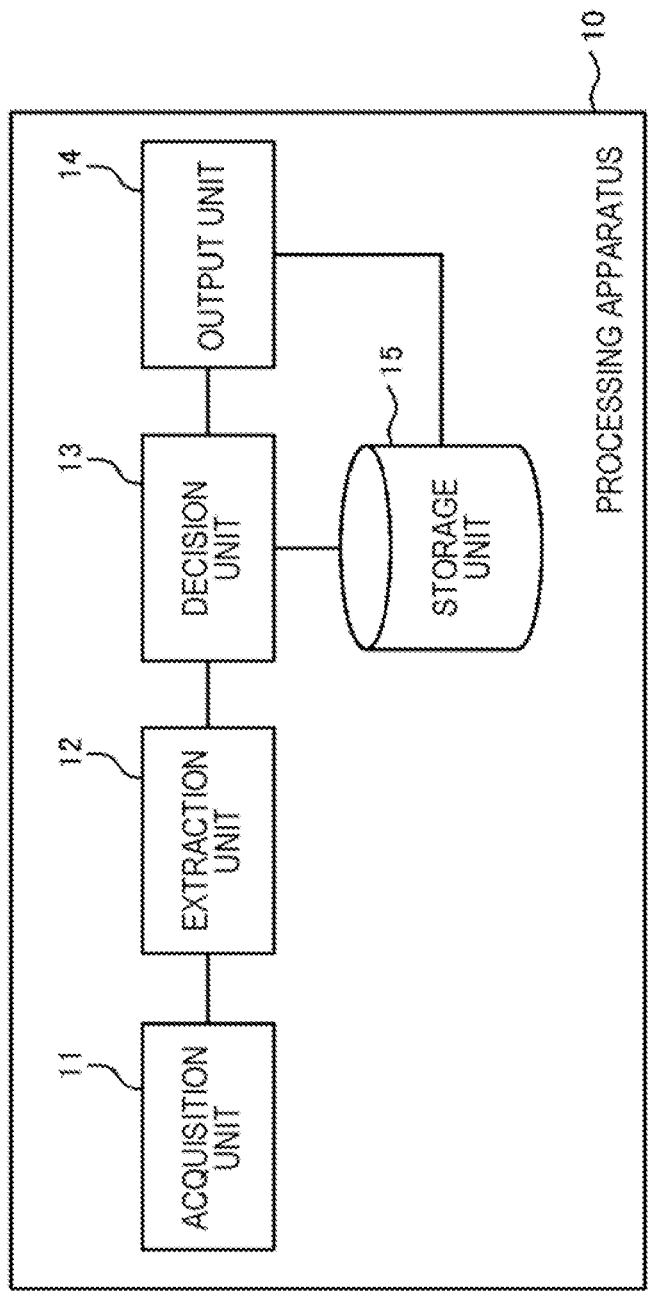
FIG. 2 is one example of a functional block diagram of the processing apparatus according to the present example embodiment.

FIG. 2 is one example of a functional block diagram of a processing apparatus 10. As illustrated, the processing apparatus 10 includes an acquisition unit 11, an extraction unit 12, a decision unit 13, an output unit 14, and a storage unit 15. Note that, the processing apparatus 10 may not include the storage unit 15. In this case, an external apparatus configured to be able to communicate with the processing apparatus 10 includes the storage unit 15.

The acquisition unit 11 acquires an image generated by a camera. The camera may capture a moving image, or may capture a still image at a predetermined timing (for example: by one second, by five seconds, or the like). The camera captures a predetermined area. The predetermined area is, for example, an area where group action is recommended. Specifically, an unsafe area, an area having a bad terrain where an accident is more likely to occur, an area having a complicated road where a person is more likely to get lost, and the like are exemplified, which are not limited thereto.

The camera may be installed (fixed) in the predetermined area. In addition, the camera may be mounted on a moving body that moves on land, and may perform capturing while moving in the predetermined area. In addition, the camera may be mounted on a moving body that flies, and may perform capturing while moving in the sky of the predetermined area.

Note that, in the present specification, "acquisition" may include "acquisition of data stored in another apparatus or a storage medium by its own apparatus (active acquisition)", based on a user input or an instruction of a program, such as reception by making a request or an inquiry to another apparatus, and reading by accessing to another apparatus or a storage medium, for example. Further, "acquisition" may include "inputting of data output from another apparatus to its own apparatus (passive acquisition)", based on a user input or an instruction of a program, such as reception of data to be distributed (or transmitted, push-notified, or the like), for example. Further, "acquisition" may include acquisition by selection from among pieces of received data or pieces of received information, and "generation of new data by editing data (such as texting, sorting of data, extraction of a part of data, and change of a file format) and the like, and acquisition of the new data".

The extraction unit 12 extracts a person (an independently acting person) taking independent action from an image. For example, the extraction unit 12 may decide, as persons taking group action together, two persons in which a duration of a state where a distance between the two persons is less than a first threshold value is equal to or longer than a reference period of time. Then, the extraction unit 12 may extract, as an independently acting person, a person in the absence of a person taking group action together in an image, among persons extracted from the image. In addition, the extraction unit 12 may extract, as an independently acting person, a person in which a state of absence of a person taking group action together in an image continues for a predetermined period of time or longer, among persons extracted from the image. Since a means for extracting a person from an image and a means for estimating an actual distance between two points in an image are widely known, description herein will be omitted. Further, the processing of extracting an independently acting person being exemplified herein is merely one example, and the extraction unit 12 may achieve extraction of an independently acting person by using another technique.

The decision unit 13 decides whether the independently acting person extracted by the extraction unit 12 belongs to any group, based on group information in which a feature value of an appearance of a person who takes group action is registered. The group information may be information in which a feature value of an appearance of a person who takes group action is registered by group.

FIG. 8 schematically illustrates one example of the group information. In the illustrated example, group identification information that identifies a plurality of groups and information about each member (person) belonging to each of the groups are associated with each other. The information about each member is a face image, a feature value of a face, and the like. Instead of a face image, an image of a whole body (also including a face portion) may be adopted. Then, instead of a feature value of a face, a feature value of a whole body (a feature value of a face, a physique, clothing, and the like) may be adopted. Note that, the group information may not include a part of the illustrated information, or may include another piece of information. The storage unit 15 stores such group information.

When there is a feature value that coincides with (has a similarity degree equal to or more than a threshold value) a feature value of an appearance of an independently acting person extracted from an image among feature values of an appearance of a plurality of persons included in group information, the decision unit 13 decides that the independently acting person belongs to a group. On the other hand, when there is no feature value that coincides with (has a similarity degree equal to or more than a threshold value) a feature value of an appearance of an independently acting person extracted from an image among feature values of an appearance of a plurality of persons included in group information, the decision unit 13 decides that the independently acting person does not belong to a group.

When it is decided that the independently acting person belongs to any group, the output unit 14 outputs notification information. The output notification information is stored in the storage unit 15, for example. FIG. 4 schematically illustrates one example of the notification information. The illustrated notification information includes information (such as an image (an image acquired by the acquisition unit 11), and group identification information) indicating an independently acting person, information indicating a place (a place where an image is captured) where the independently acting person takes independent action, and a date and time (a date and time at which an image is captured) at which the independently acting person takes independent action. Note that, the notification information may not include a part of the illustrated information, or may include another piece of information.

Figure 5:
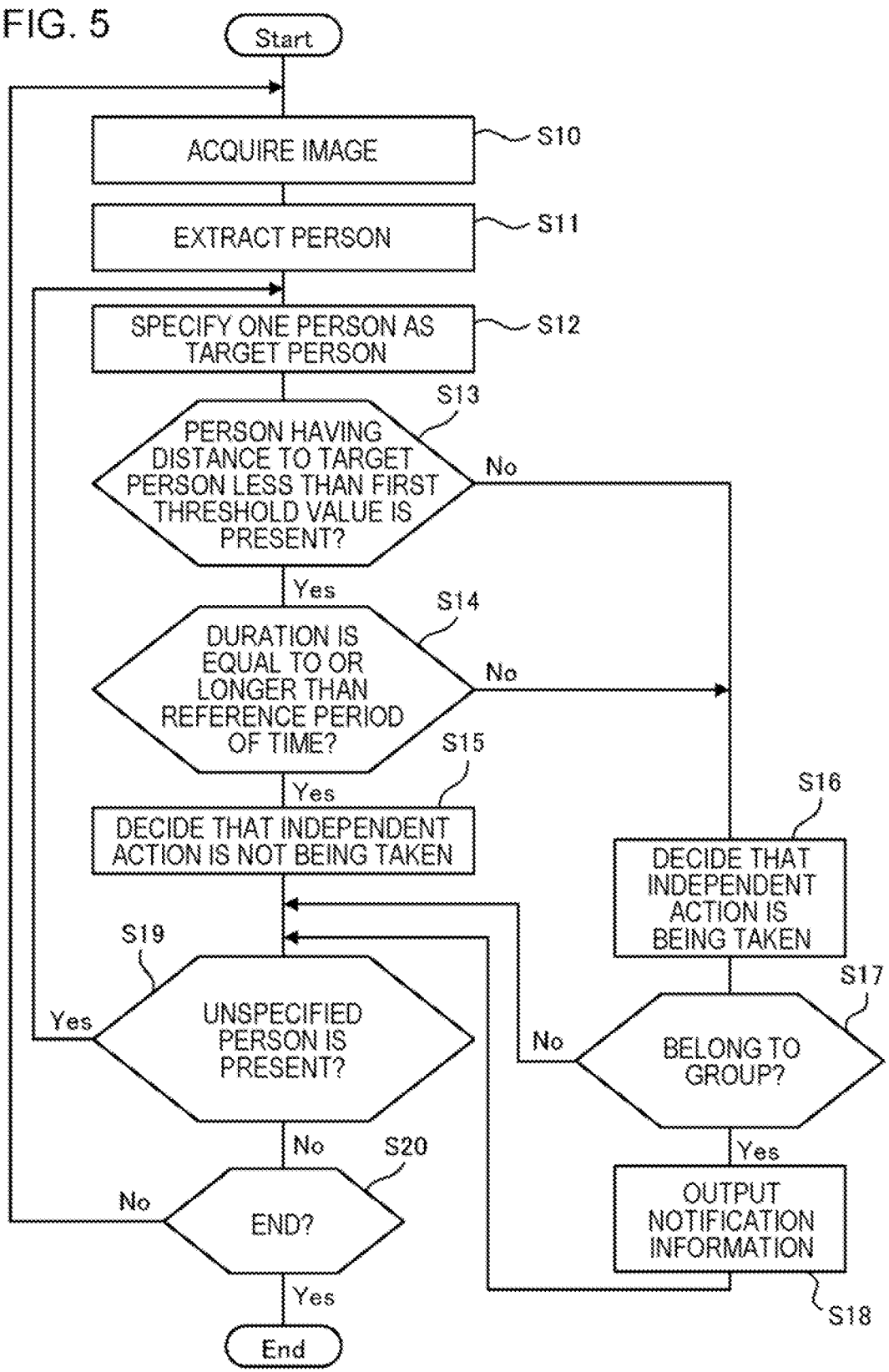
FIG. 5 is a flowchart illustrating one example of a flow of processing of the processing apparatus according to the present example embodiment.

Next, one example of a flow of processing of the processing apparatus 10 will be described by using a flowchart in FIG. 5.

When the acquisition unit 11 acquires an image (S10), the extraction unit 12 extracts a person from the image (S11).

Then, the extraction unit 12 specifies, as a target person, one person among the extracted persons (S12).

Next, the extraction unit 12 decides whether a person having a distance to the target person less than a first threshold value is present in the image (S13). When the person is not present (No in S13), the extraction unit 12 decides that the target person is taking independent action, and extracts the target person as an independently acting person (S16).

On the other hand, when a person having a distance to the target person less than the first threshold value is present (Yes in S13), the extraction unit 12 decides whether a duration of a state where the distance between the person and the target person is less than the first threshold value is equal to or longer than a reference period of time (S14).

When a relationship in which the duration is equal to or longer than the reference period of time is satisfied in a relationship with any person having the distance to the target person less than the first threshold value (Yes in S14), the extraction unit 12 decides that the target person is not taking independent action (S15). Subsequently, the processing proceeds to S19.

On the other hand, when a relationship in which the duration is equal to or longer than the reference period of time is not satisfied in a relationship with all persons having the distance to the target person less than the first threshold value (No in S14), the extraction unit 12 decides that the target person is taking independent action, and extracts the target person as an independently acting person (S16).

Subsequent to S16, the decision unit 13 decides whether the target person extracted as the independently acting person belongs to any group, based on group information as illustrated in FIG. 3 (S17). Then, when it is decided that the target person belongs to a group (Yes in S17), the output unit 14 outputs notification information (S18). Subsequently, the processing proceeds to S19. The output notification information is stored in the storage unit 15, for example (see FIG. 4).

On the other hand, when it is decided that the target person does not belong to a group (No in S17), the processing proceeds to S19.

In S19, the extraction unit 12 decides whether a person that is not specified as a target person is present in the persons extracted in S11. When the person is present (Yes in S19), the processing returns to S12, and similar processing is performed. On the other hand, when the person is not present (No in S19), and there is no input for ending the processing (No in S20), the processing returns to S10, and similar processing is performed.

As described above, when the processing apparatus 10 according to the present example embodiment extracts a person (an independently acting person) taking independent action from an image, the processing apparatus 10 decides whether the extracted independently acting person belongs to any group, based on "group information in which a feature value of an appearance of a person who takes group action is registered by group" being held in advance. Then, when it is decided that the independently acting person belongs to any group, notification information is output. Such a processing apparatus 10 can detect a person who leaves a group and takes independent action.

Further, when the processing apparatus 10 detects a person who leaves a group and takes independent action, the processing apparatus 10 can accumulate notification information related to the independently acting person as in FIG. 4. Thus, when any independently acting person is caught up in some sort of trouble, a trail of the person can be searched based on the accumulated notification information.

Second Example Embodiment

Figure 7:
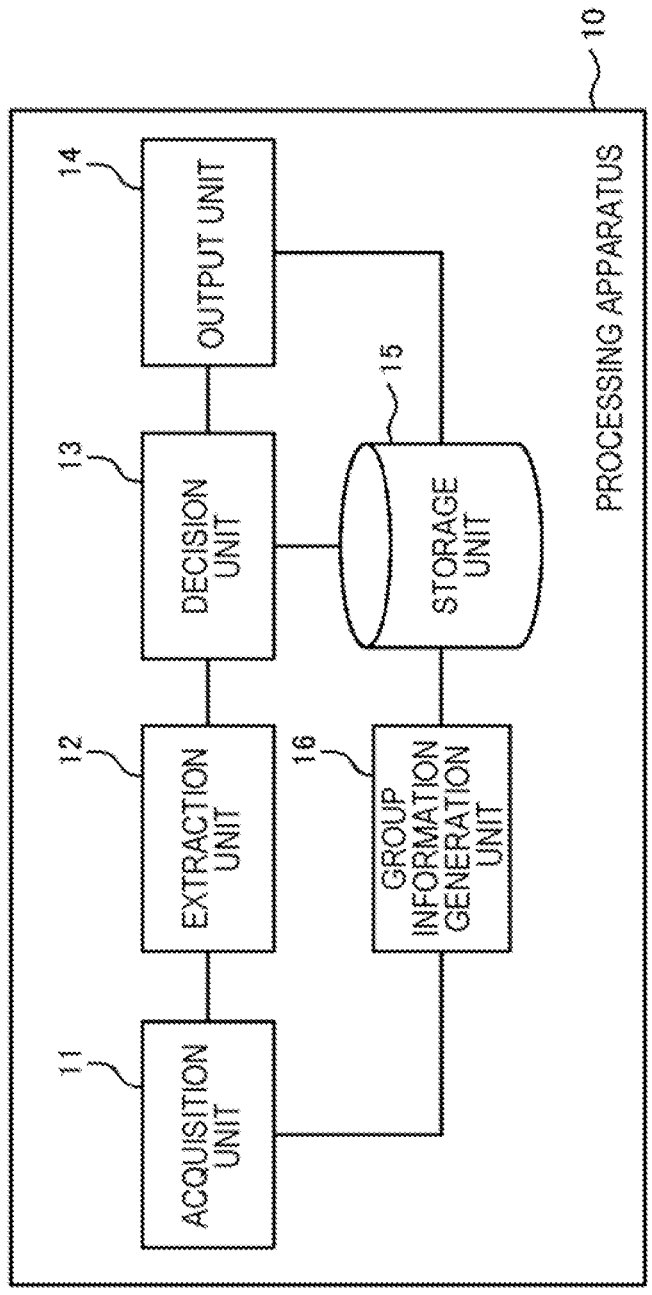
FIG. 7 is a flowchart illustrating one example of a flow of processing of the processing apparatus according to the present example embodiment.

A processing apparatus 10 according to the present example embodiment has functions of automatically generating group information, based on an analysis result of an image acquired by an acquisition unit 11, and storing the group information in a storage unit 15. FIG. 7 is one example of a functional block diagram of the processing apparatus 10. The processing apparatus 10 according to the present example embodiment is different from the processing apparatus 10 according to the first example embodiment in a point that the processing apparatus 10 according to the present example embodiment includes a group information generation unit 16.

The group information generation unit 16 registers in group information, a feature value of an appearance of each of two persons in which a duration of a state where a distance between the two persons is less than a first threshold value satisfies a reference period of time or longer, in association with the same group (group identification information).

FIG. 8 schematically illustrates one example of the group information generated by the group information generation unit 16 according to the present example embodiment. In a case of the present example embodiment, only information that can be acquired from an image acquired by the acquisition unit 11 is registered as information about each member in the group information. In the illustrated example, as the information about each member, a face image, a feature value of a face, and the like are registered. Instead of a face image, an image of a whole body (also including a face portion) may be adopted. Then, instead of a feature value of a face, a feature value of a whole body (a feature value of a face, a physique, clothing, and the like) may be adopted. Note that, the group information may not include a part of the illustrated information, or may include another piece of information. The storage unit 15 stores such group information.

Figure 9:
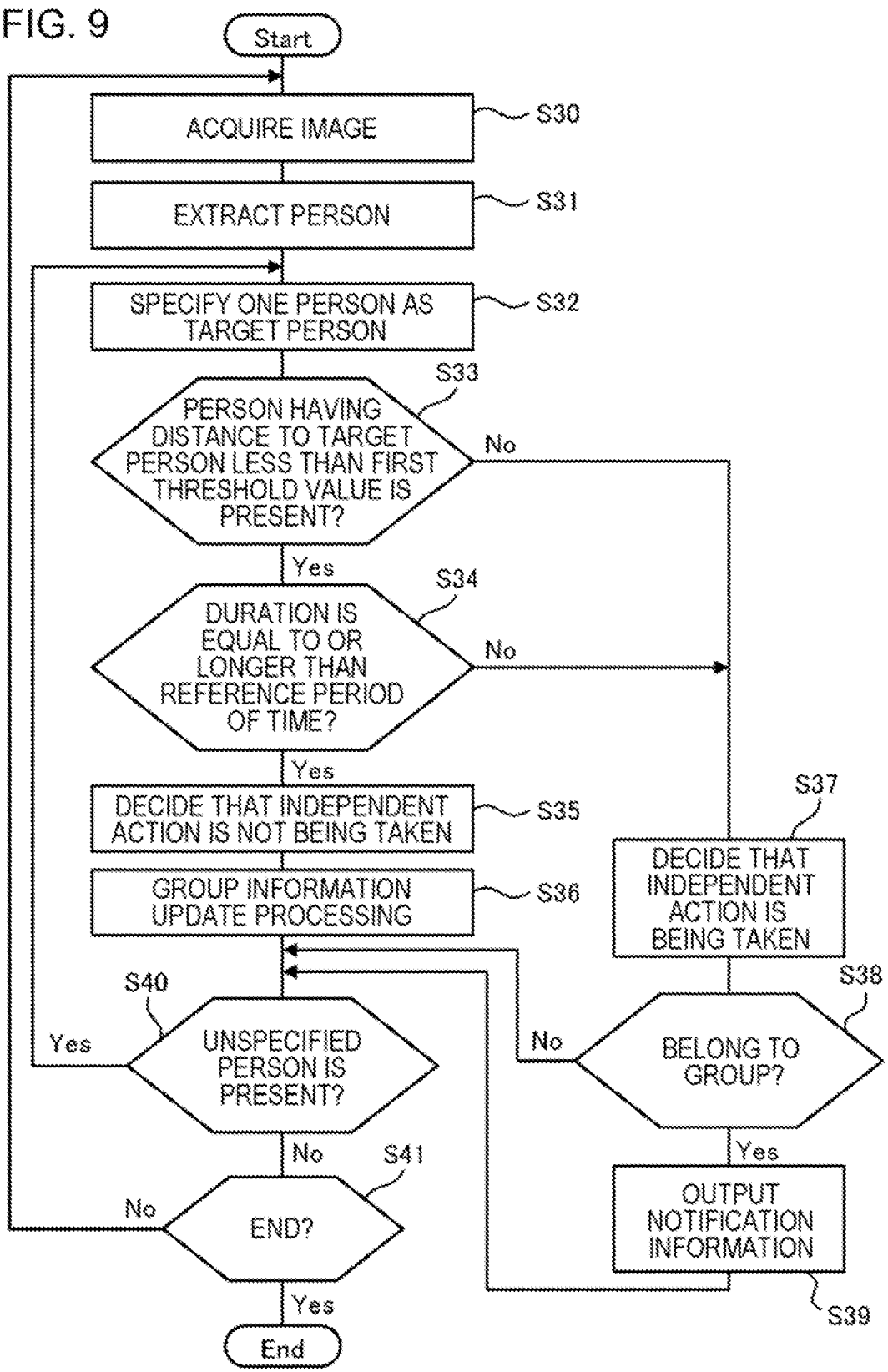
FIG. 9 is a diagram schematically illustrating one example of information processed by the processing apparatus according to the present example embodiment.

Next, one example of a flow of processing of the processing apparatus 10 will be described by using a flowchart in FIG. 9.

When the acquisition unit 11 acquires an image (S30), the extraction unit 12 extracts a person from the image (S31). Then, an extraction unit 12 specifies, as a target person, one person among the extracted persons (S32).

Next, the extraction unit 12 decides whether a person having a distance to the target person less than a first threshold value is present in the image (S33). When the person is not present (No in S33), the extraction unit 12 decides that the target person is taking independent action, and extracts the target person as an independently acting person (S37).

On the other hand, when a person having a distance to the target person less than the first threshold value is present (Yes in S33), the extraction unit 12 decides whether a duration of a state where the distance between the person and the target person is less than the first threshold value is equal to or longer than a reference period of time (S34).

When a relationship in which the duration is equal to or longer than the reference period of time is satisfied in a relationship with any person having the distance to the target person less than the first threshold value (Yes in S34), the extraction unit 12 decides that the target person is not taking independent action (S35).

Subsequently, the group information generation unit 16 performs update processing of group information (S36). Specifically, the group information generation unit 16 confirms whether a pair of a "feature value of an appearance of a target person" and a "feature value of an appearance of a person in which a duration of a state where a distance to the target person is less than a first threshold value is equal to or longer than a reference period of time" is registered in group information in association with the same group identification information.

Then, when the pair is not registered, the group information generation unit 16 registers, in the group information, a pair of a "feature value of an appearance of a target person" and a "feature value of an appearance of a person in which a duration of a state where a distance to the target person is less than the first threshold value is equal to or longer than the reference period of time", in association with the same group identification information. On the other hand, when the pair is registered, the group information generation unit 16 does not perform the update of group information. After S36, the processing apparatus 10 proceeds to S40.

On the other hand, when a relationship in which the duration is equal to or longer than the reference period of time is not satisfied in a relationship with all persons having the distance to the target person less than the first threshold value (No in S34), the extraction unit 12 decides that the target person is taking independent action, and extracts the target person as an independently acting person (S37).

Subsequent to S37, a decision unit 13 decides whether the target person extracted as the independently acting person belongs to any group, based on group information as illustrated in FIG. 3 (S38). Then, when it is decided that the target person belongs to a group (Yes in S38), an output unit 14 outputs notification information (S39). Subsequently, the processing proceeds to S40. The output notification information is stored in the storage unit 15, for example (see FIG. 4).

On the other hand, when it is decided that the target person does not belong to a group (No in S38), the processing proceeds to S40.

In S40, the extraction unit 12 decides whether a person that is not specified as a target person is present in the persons extracted in S31. When the person is present (Yes in S40), the processing returns to S42, and similar processing is performed. On the other hand, when the person is not present (No in S40), and there is no input for ending the processing (No in S41), the processing returns to S30, and similar processing is performed.

Another configuration of the processing apparatus 10 is similar to that in the first example embodiment.

As described above, the processing apparatus 10 according to the present example embodiment can achieve an advantageous effect similar to that of the processing apparatus 10 according to the first example embodiment.

Further, the processing apparatus 10 according to the present example embodiment can automatically generate group information without an operation (advanced registration, or the like) by a user. Thus, it is expected that a target detectable as a person who leaves a group and takes independent action expands, and a detection rate of a person who leaves a group and takes independent action increases.

Third Example Embodiment

A processing apparatus 10 according to the present example embodiment has functions of generating group information, and storing the group information in a storage unit 15. FIG. 7 is one example of a functional block diagram of the processing apparatus 10. The processing apparatus 10 according to the present example embodiment is different from the processing apparatus 10 according to the first example embodiment in a point that the processing apparatus 10 according to the present example embodiment includes a group information generation unit 16.

The group information generation unit 16 generates group information, and stores the group information in the storage unit 15. The group information generation unit 16 according to the present example embodiment generates group information about each group, based on a user input. For example, an application for a service of the processing apparatus 10 may be installed on a terminal apparatus (such as a smartphone, a tablet terminal, a smartwatch, a cellular phone, and a personal computer) of a person who receives the service. Then, a user may perform, via the application, creation of a group, registration of various pieces of information (such as a name, a contact address, and an image (a face image and the like)) about a member belonging to a created group, registration of an emergency contact address, and the like. In addition, the registration may be performed from a Web page related to a service of the processing apparatus 10.

FIG. 3 schematically illustrates one example of the group information generated by the group information generation unit 16 according to the present example embodiment. In the illustrated example, group identification information that identifies a plurality of groups, an emergency contact address of each of the groups, and information about each member belonging to each of the groups are associated with one another. The information about each member is a name, a contact address, a face image, a feature value of a face, and the like. Instead of a face image, an image of a whole body (also including a face portion) may be adopted. Then, instead of a feature value of a face, a feature value of a whole body (a feature value of a face, a physique, clothing, and the like) may be adopted. Note that, the group information may not include a part of the illustrated information, or may include another piece of information. The storage unit 15 stores such group information.

FIG. 4 schematically illustrates one example of notification information output from an output unit 14 according to the present example embodiment. As illustrated, the notification information according to the present example embodiment can include a name and the like of an independently acting person.

Another configuration of the processing apparatus 10 is similar to that in the first and second example embodiments.

As described above, the processing apparatus 10 according to the present example embodiment can achieve an advantageous effect similar to that of the processing apparatus 10 according to the first and second example embodiments.

Further, with the processing apparatus 10 according to the present example embodiment, a user can create a group by a relatively easy operation, and can register a person who takes group action together in group information. When registration of group information is troublesome, the number of users who use a service of the processing apparatus 10 decreases. Of course, when a user does not user a service (when a user is not registered in group information), the user is never detected as a person who leaves a group and takes independent action. Thus, when the number of users who use a service of the processing apparatus 10 is small, a detection rate of a person who leaves a group and takes independent action decreases.

With the processing apparatus 10 according to the present example embodiment that can register group information by a relatively easy operation, it is expected that the number of users increases, and, as a result, a detection rate of a person who leaves a group and takes independent action increases.

Fourth Example Embodiment

Figure 6:
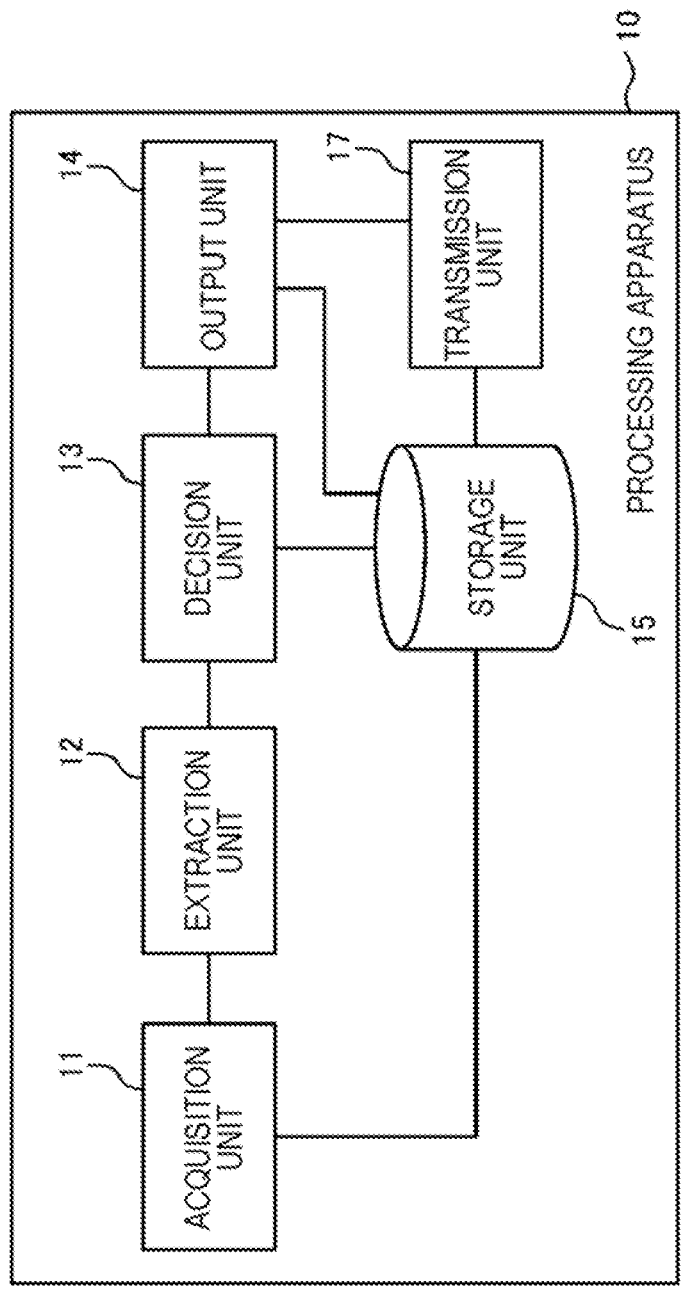
FIG. 6 is one example of a functional block diagram of the processing apparatus according to the present example embodiment.

A processing apparatus 10 according to the present example embodiment has a function of transmitting, to an external apparatus, notification information output from an output unit 14. FIG. 6 is one example of a functional block diagram of the processing apparatus 10. The processing apparatus 10 according to the present example embodiment is different from the processing apparatus 10 according to the first to third example embodiments in a point that the processing apparatus 10 according to the present example embodiment includes a transmission unit 17. Note that, the processing apparatus 10 may further include a group information generation unit 16.

The transmission unit 17 transmits, to an external apparatus, notification information output from the output unit 14. For example, the transmission unit 17 may transmit notification information to an emergency contact address associated with a group to which an independently acting person belongs. In this case, as illustrated in FIG. 3, an emergency contact address is registered in association with each group in group information according to the present example embodiment.

For example, an e-mail address may be registered as an emergency contact address. Then, the transmission unit 17 may transmit an e-mail message including notification information to, as a destination, an e-mail address registered as an emergency contact address.

In addition, an application for a service of the processing apparatus 10 may be installed on a terminal apparatus (such as a smartphone, a tablet terminal, a smartwatch, a cellular phone, and a personal computer) of a person who receives the service. Then, user identification information in the service may be registered as an emergency contact address. Then, the transmission unit 17 may transmit notification information to a terminal apparatus of a user determined by the user identification information registered as the emergency contact address. For example, a push notification may be used, or notification information may be able to be viewed from a predetermined menu of the application.

In addition, the transmission unit 17 may transmit notification information to an apparatus of the police, a security company, a travel agency, and the like through wired and/or wireless communication. An address of a transmission destination is stored in advance in a storage unit 15, and the transmission unit 17 transmits notification information to the address as a destination.

Another configuration of the processing apparatus 10 is similar to that in the first to third example embodiments.

As described above, the processing apparatus 10 according to the present example embodiment can achieve an advantageous effect similar to that of the processing apparatus 10 according to the first to third example embodiments.

Further, when the processing apparatus 10 detects a person who leaves a group and takes independent action, the processing apparatus 10 can transmit, to an external apparatus, notification information related to the independently acting person.

For example, the processing apparatus 10 can transmit notification information to an emergency contact address of a group to which an independently acting person belongs.

Thus, a person registered as an emergency contact address of a group can quickly recognize a fact that a member of the group is taking independent action. Then, an appropriate response such as finding a person by relying on positional information and date-and-time information that are included in the notification information, and asking the police, a security company, a travel agency, and the like for help can be quickly made.

Further, the processing apparatus 10 can transmit notification information to an apparatus of the police, a security company, a travel agency, and the like. Thus, the police, a security company, a travel agency, and the like can quickly recognize a fact that a person recommended to take group action is taking independent action. Then, an appropriate response such as finding a person by relying on positional information and date-and-time information that are included in the notification information, and protecting a person can be quickly made.

Fifth Example Embodiment

A processing apparatus 10 according to the present example embodiment is different from the first to fourth example embodiments in details of processing of extracting an independently acting person. One example of a functional block diagram of the processing apparatus 10 according to the present example embodiment is similar to the processing apparatus 10 according to the first to fourth example embodiments.

An extraction unit 12 decides that a target person is taking independent action when a person in which a state where a distance to the target person is less than a first threshold value continues for a reference period of time or longer is not present, and another person of a group to which the target person belongs is not present in an area having a distance from the target person less than a second threshold value. The first threshold value is smaller than the second threshold value.

Note that, the extraction unit 12 may decide that a target person is taking independent action when a person in which a state where a distance to the target person is less than the first threshold value continues for the reference period of time or longer is not present, and a state where another person of a group to which the target person belongs is not present in an area having a distance from the target person less than the second threshold value continues for a predetermined period of time or longer. The first threshold value is smaller than the second threshold value.

Next, one example of a flow of processing of the processing apparatus 10 will be described by using a flowchart in FIG. 11. In the flow of the processing, a group information generation unit 16 generates group information by the means described in the fourth example embodiment, but a means for generating group information is not limited to this in the present example embodiment.

When an acquisition unit 11 acquires an image (S50), the extraction unit 12 extracts a person from the image (S51). Then, the extraction unit 12 specifies, as a target person, one person among the extracted persons (S52).

Next, the extraction unit 12 decides whether a person having a distance to the target person less than a first threshold value is present in the image (S53). When the person is not present (No in S53), the extraction unit 12 decides whether another member of a group to which the target person belongs is present in an area less than a second threshold value from the target person (S57). When the another member is not present (No in S57), the extraction unit 12 decides that the target person is taking independent action, and extracts the target person as an independently acting person (S59).

On the other hand, when the another member is present (Yes in S57), the extraction unit 12 decides that the target person is not taking independent action (S58). Then, the processing proceeds to S62.

Further, when a person having a distance to the target person less than the first threshold value is present (Yes in S53), the extraction unit 12 decides whether a duration of a state where the distance between the person and the target person is less than the first threshold value is equal to or longer than a reference period of time (S54).

When a relationship in which the duration is equal to or longer than the reference period of time is satisfied in a relationship with any person having the distance to the target person less than the first threshold value (Yes in S54), the extraction unit 12 decides that the target person is not taking independent action (S55).

Subsequently, the group information generation unit 16 performs update processing of group information (S56). Specifically, the group information generation unit 16 confirms whether a pair of a "feature value of an appearance of a target person" and a "feature value of an appearance of a person in which a duration of a state where a distance to the target person is less than a first threshold value is equal to or longer than a reference period of time" is registered in group information in association with the same group identification information.

Then, when the pair is not registered, the group information generation unit 16 registers, in the group information, a pair of a "feature value of an appearance of a target person" and a "feature value of an appearance of a person in which a duration of a state where a distance to the target person is less than the first threshold value is equal to or longer than the reference period of time", in association with the same group identification information. On the other hand, when the pair is registered, the group information generation unit 16 does not perform the update of group information. After S56, the processing apparatus 10 proceeds to S62.

On the other hand, when a relationship in which the duration is equal to or longer than the reference period of time is not satisfied in a relationship with all persons having the distance to the target person less than the first threshold value (No in S54), the processing apparatus 10 proceeds to S57. Since a flow of the processing in S57, S58, and S59 is as described above, description herein will be omitted.

Subsequent to S59, a decision unit 13 decides whether the target person extracted as the independently acting person belongs to any group, based on group information as illustrated in FIG. 3 (S60). Then, when it is decided that the target person belongs to a group (Yes in S60), an output unit 14 outputs notification information (S61). Subsequently, the processing proceeds to S62. The output notification information is stored in the storage unit 15, for example (see FIG. 4).

On the other hand, when it is decided that the target person does not belong to a group (No in S60), the processing proceeds to S62.

In S62, the extraction unit 12 decides whether a person that is not specified as a target person is present in the persons extracted in S51. When the person is present (Yes in S62), the processing returns to S52, and similar processing is performed. On the other hand, when the person is not present (No in S62), and there is no input for ending the processing (No in S63), the processing returns to S50, and similar processing is performed.

Another configuration of the processing apparatus 10 is similar to that in the first to fourth example embodiments.

As described above, the processing apparatus 10 according to the present example embodiment can achieve an advantageous effect similar to that of the processing apparatus 10 according to the first to fourth example embodiments. Further, the processing apparatus 10 according to the present example embodiment can extract an independently acting person by using group information. Specifically, the processing apparatus 10 can confirm whether another member belonging to the same group is present around a target person, and can decide whether a person is an independently acting person in response to the result. Thus, extraction accuracy of an independently acting person improves.

Further, the processing apparatus 10 according to the present example embodiment can set different values to a threshold value (first threshold value) of a distance for deciding that a person is a member of the same group, and a threshold value (second threshold value) of a distance between members for deciding whether independent action is taken. Specifically, the first threshold value is set smaller than the second threshold value.

When the first threshold value is set too great, there is a risk that unrelated persons may be decided as members of the same group and registered in group information, and the like. Thus, in order to accurately detect a member of the same group, the first threshold value needs to be set small to some extent. Meanwhile, it is rare for even members of the same group to maintain a relationship in which a distance between the members is always equal to or less than the first threshold value, and the members may also temporarily stay slightly away from each other and separately take action. In this way, in order not to decide, as an independently acting person by mistake, a person who temporarily stays slightly away from another member, the second threshold value needs to be set great to some extent.

When the first threshold value and the second threshold value are set to the same value regardless of such an actual condition, accuracy for detecting a member of the same group and accuracy for detecting an independently acting person who leaves a group decrease. The processing apparatus 10 according to the present example embodiment that sets different values to the first threshold value and the second threshold value and sets the first threshold value smaller than the second threshold value can accurately detect a member of the same group, and can accurately detect an independently acting person who leaves a group.

Sixth Example Embodiment

A processing apparatus 10 according to the present example embodiment has functions of deciding whether outputting of notification information is necessary when the processing apparatus 10 detects an independently acting person who leaves a group, and outputting the notification information when the processing apparatus 10 decides that it is necessary. One example of a functional block diagram of the processing apparatus 10 according to the present example embodiment is similar to the processing apparatus 10 according to the first to fifth example embodiments.

As illustrated in FIG. 3, a personal contact address of each person belonging to a group is registered in group information according to the present example embodiment. Then, when it is decided that an independently acting person extracted from an image belongs to any group, an output unit 14 transmits, to a contact address of any person of the group to which the independently acting person belongs, a question inquiring about whether the independently acting person has strayed, and receives a reply to whether the independently acting person has strayed. A transmission destination of a question may be an independently acting person or may be another person.

For example, an e-mail address may be registered as a personal contact address. Then, the output unit 14 may transmit the question described above to, as a destination, an e-mail address registered as a personal contact address. Further, a URL of a Web page for a reply may be included in the e-mail message. Then, the output unit 14 may receive a reply to a question from the Web page.

In addition, an application for a service of the processing apparatus 10 may be installed on a terminal apparatus (such as a smartphone, a tablet terminal, a smartwatch, a cellular phone, and a personal computer) of a person who receives the service. Then, user identification information in the service may be registered as a personal contact address. Then, the output unit 14 may transmit the question described above to a terminal apparatus of a user determined by the user identification information registered as the personal contact address, and receive a reply to the question from a page of the application.

Then, the output unit 14 outputs notification information when the received reply indicates that an independently acting person has strayed, and the output unit 14 does not output notification information when the received reply does not indicate that an independently acting person has strayed.

Another configuration of the processing apparatus 10 is similar to that in the first to fifth example embodiments.

As described above, the processing apparatus 10 according to the present example embodiment can achieve an advantageous effect similar to that of the processing apparatus 10 according to the first to fifth example embodiments. Further, the processing apparatus 10 according to the present example embodiment can inquire of a person of a group to which an independently acting person who leaves a group belongs about whether the independently acting person has strayed when the processing apparatus 10 detects the independently acting person, and can output notification information when the independently acting person has strayed.

It is conceivable that even a person belonging to a group may stay away from another person and take action in agreement with the another person for some reasons. When notification information is also output in such a case, reliability of the output notification information may decrease. The processing apparatus 10 according to the present example embodiment can output notification information when the notification information truly needs to be output, and thus reliability of the output notification information increases.

Seventh Example Embodiment

A processing apparatus 10 according to the present example embodiment has functions of deciding whether outputting of notification information is necessary when the processing apparatus 10 detects an independently acting person who leaves a group, and outputting the notification information when the processing apparatus 10 decides that it is necessary. One example of a functional block diagram of the processing apparatus 10 according to the present example embodiment is similar to the processing apparatus 10 according to the first to sixth example embodiments.

An output unit 14 outputs notification information when a behavior of an independently acting person satisfies a notification condition. The notification condition is to "correspond to a predetermined behavior". The predetermined behavior is a typical behavior exhibited by a person who has strayed from a group, and is, for example, looking around and the like, which are not limited thereto.

The behavior of looking around can be detected based on a movement of a face of an independently acting person, for example. As one example, when a face of an independently acting person constantly moves to up, down, left, and right during a first predetermined period of time (for example: one minute) without stopping for a second predetermined period of time (for example: three seconds) or longer, the output unit 14 may decide that the independently acting person looks around.

Another configuration of the processing apparatus 10 is similar to that in the first to sixth example embodiments.

As described above, the processing apparatus 10 according to the present example embodiment can achieve an advantageous effect similar to that of the processing apparatus 10 according to the first to sixth example embodiments. Further, the processing apparatus 10 according to the present example embodiment can decide whether an independently acting person who leaves a group has strayed, based on a behavior of the independently acting person, when the processing apparatus 10 detects the independently acting person. The processing apparatus 10 can output notification information when the processing apparatus 10 decides that the independently acting person has strayed.

It is conceivable that even a person belonging to a group may stay away from another person and take action in agreement with the another person for some reasons. When notification information is also output in such a case, reliability of the output notification information may decrease. The processing apparatus 10 according to the present example embodiment can output notification information when the notification information truly needs to be output, and thus reliability of the output notification information increases.

Modification Example

Modification examples applicable to all of the example embodiments will be described. The extraction unit 12 may decide whether an image acquired by an acquisition unit 11 is an image of a predetermined area (for example, an area where group action is recommended), based on a content of the image and a time period in which the image is generated. Then, the extraction unit 12 may perform processing of extracting an independently acting person when the extraction unit 12 decides that the image is the image of the predetermined area, and the extraction unit 12 may not perform the processing of extracting an independently acting person when the extraction unit 12 decides that the image is not the image of the predetermined area.

When a camera is mounted on a moving body, the camera may perform capturing not only in an area where group action is recommended but also in another area. Further, there is an area that is relatively safe in the daytime and does not correspond to an area where group action is recommended, but is unsafe in the nighttime and corresponds to an area where group action is recommended. When all images generated by the camera are set as a processing target regardless of such a circumstance, a processing load on the processing apparatus 10 increases. According to the modification example, only an image that needs to be processed can be set as a processing target, and thus a processing load on the processing apparatus 10 is reduced.

The invention of the present application is described above with reference to the example embodiments (examples), but the invention of the present application is not limited to the example embodiments (examples) described above. Various modifications that can be understood by those skilled in the art can be made to the configuration and the details of the invention of the present application within the scope of the invention of the present application.

A part or the whole of the above-described example embodiments may also be described as in supplementary notes below, which is not limited thereto.

1. A processing apparatus, including:
    an acquisition means for acquiring an image generated by a camera;
    an extraction means for extracting, from the image, an independently acting person being a person taking independent action;
    a decision means for deciding whether the independently acting person belongs to any of groups, based on group information in which a feature value of an appearance of a person who takes group action is registered; and
    an output means for outputting notification information when it is decided that the independently acting person belongs to any of the groups.
2. The processing apparatus according to supplementary note 1, further including
    a group information generation means for registering, in the group information, a feature value of an appearance of each of two persons in which a duration of a state where a distance between the two persons is less than a first threshold value satisfies a reference period of time or longer, in association with the same group.
3. The processing apparatus according to supplementary note 2, wherein
    the extraction means decides that a target person is taking independent action when a person in which a state where a distance to the target person is less than the first threshold value continues for a reference period of time or longer is not present, and another person of the group to which the target person belongs is not present in an area having a distance from the target person less than a second threshold value, and
    the first threshold value is smaller than the second threshold value.
4. The processing apparatus according to any of supplementary notes 1 to 3, wherein
    the notification information includes information indicating the independently acting person and information indicating a position where independent action is taken.
5. The processing apparatus according to any of supplementary notes 1 to 4, further including
    a storage unit that accumulates the notification information output from the output means.
6. The processing apparatus according to any of supplementary notes 1 to 5, wherein
    an emergency contact address is registered in the group information, and
    the processing apparatus further includes
    a transmission means for transmitting, to the emergency contact address associated with a group to which the independently acting person belongs, the notification information output from the output means.

7. The processing apparatus according to any of supplementary notes 1 to 6, wherein
a personal contact address of each person belonging to the group is registered in the group information, and
the output means
transmits, to the personal contact address of any person of the group to which the independently acting person belongs, a question inquiring about whether the independently acting person has strayed,
receives a reply to whether the independently acting person has strayed, and
outputs the notification information when the reply indicates that the independently acting person has strayed.

8. The processing apparatus according to any of supplementary notes 1 to 7, wherein
the output means outputs the notification information when a behavior of the independently acting person satisfies a notification condition.

9. A processing method, including:
by a computer,
acquiring an image generated by a camera;
extracting, from the image, an independently acting person being a person taking independent action;
deciding whether the independently acting person belongs to any of groups, based on group information in which a feature value of an appearance of a person who takes group action is registered; and
outputting notification information when it is decided that the independently acting person belongs to any of the groups.

10. A program causing a computer to function as:
an acquisition means for acquiring an image generated by a camera;
an extraction means for extracting, from the image, an independently acting person being a person taking independent action;
a decision means for deciding whether the independently acting person belongs to any of groups, based on group information in which a feature value of an appearance of a person who takes group action is registered; and
an output means for outputting notification information when it is decided that the independently acting person belongs to any of the groups.

What is claimed is:

1. A processing apparatus comprising:
at least one memory storing one or more instructions; and
at least one processor configured to execute the one or more instructions to:
acquire an image generated by a camera;
extract, from the image, an independently acting person being a person taking independent action;
decide whether the independently acting person belongs to any of groups, based on group information in which a feature value of an appearance of a person who takes group action is registered; and
output notification information when having decided that the independently acting person belongs to any of the groups, wherein
a personal contact address of each person belonging to the group is registered in the group information, and
the processor is further configured to execute the one or more instructions to further:
transmit, to the personal contact address of any person of the group to which the independently acting person belongs, a question inquiring about whether the independently acting person has strayed:
receive a reply to whether the independently acting person has strayed; and
output the notification information when the reply indicates that the independently acting person has strayed.

2. The processing apparatus according to claim 1, wherein the processor is further configured to execute the one or more instructions to register, in the group information, a feature value of an appearance of each of two persons in which a duration of a state where a distance between the two persons is less than a first threshold value satisfies a reference period of time or longer, in association with the same group.

3. The processing apparatus according to claim 1, wherein the notification information includes information indicating the independently acting person and information indicating a position where independent action is taken.

4. The processing apparatus according to claim 1, wherein the processor is further configured to execute the one or more instructions to accumulate the notification information.

5. The processing apparatus according to claim 1, wherein
an emergency contact address is registered in the group information, and
the processor is further configured to execute the one or more instructions to transmit, to the emergency contact address associated with a group to which the independently acting person belongs, the notification information output.

6. The processing apparatus according to claim 1, wherein the processor is further configured to execute the one or more instructions to output the notification information when a behavior of the independently acting person satisfies a notification condition.

7. A processing method performed by a computer and comprising:
acquiring an image generated by a camera;
extracting, from the image, an independently acting person being a person taking independent action;
deciding whether the independently acting person belongs to any of groups, based on group information in which a feature value of an appearance of a person who takes group action is registered; and
outputting notification information when having decided that the independently acting person belongs to any of the groups, wherein
a personal contact address of each person belonging to the group is registered in the group information, and
the processing method further comprises:
transmitting, to the personal contact address of any person of the group to which the independently acting person belongs, a question inquiring about whether the independently acting person has strayed;
receiving a reply to whether the independently acting person has strayed; and
outputting the notification information when the reply indicates that the independently acting person has strayed.

8. A non-transitory storage medium storing a program causing executable by a computer to:
acquire an image generated by a camera;
extract, from the image, an independently acting person being a person taking independent action;
decide whether the independently acting person belongs to any of groups, based on group information in which a feature value of an appearance of a person who takes group action is registered; and output notification information when having decided that the independently acting person belongs to any of the groups, wherein a personal contact address of each person belonging to the group is registered in the group information, and the program is executable by the computer to further:
  transmit, to the personal contact address of any person of the group to which the independently acting person belongs, a question inquiring about whether the independently acting person has strayed;
  receive a reply to whether the independently acting person has strayed; and
  output the notification information when the reply indicates that the independently acting person has strayed.

* * * * *